United States Patent
Chan et al.

(10) Patent No.: US 12,067,749 B2
(45) Date of Patent: Aug. 20, 2024

(54) COLOR CHANNEL CORRELATION DETECTION

(71) Applicants: Advanced Micro Devices, Inc., Santa Clara, CA (US); ATI Technologies ULC, Markham (CA)

(72) Inventors: Anthony Chan, Markham (CA); Christopher J. Brennan, Boxborough, MA (US); Angel Serah, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 100 days.

(21) Appl. No.: 17/562,777

(22) Filed: Dec. 27, 2021

(65) Prior Publication Data

US 2023/0206503 A1 Jun. 29, 2023

(51) Int. Cl.
  *G06T 7/90* (2017.01)
  *G01J 3/46* (2006.01)
  *G06T 9/00* (2006.01)

(52) U.S. Cl.
  CPC .............. *G06T 7/90* (2017.01); *G01J 3/463* (2013.01); *G06T 9/00* (2013.01); *G01J 2003/467* (2013.01); *G06T 2207/10024* (2013.01)

(58) Field of Classification Search
  CPC ... G06T 7/90; G06T 9/00; G06T 2207/10024; G01J 3/463; G01J 2003/467
  See application file for complete search history.

(56) References Cited

U.S. PATENT DOCUMENTS

| | | |
|---|---|---|
| 5,130,786 A | 7/1992 | Murata et al. |
| 8,837,006 B2 | 9/2014 | McDowell et al. |
| 10,244,245 B2 | 3/2019 | Rusanovskyy et al. |
| 2009/0226084 A1 | 9/2009 | Courchesne et al. |
| 2012/0013758 A1* | 1/2012 | Frederiksen ............ H04N 9/67 348/222.1 |
| 2015/0227540 A1 | 8/2015 | Lin et al. |
| 2017/0366819 A1* | 12/2017 | Wu ........................ H04N 19/88 |
| 2020/0351503 A1* | 11/2020 | Martinelli ............ H04N 19/176 |

FOREIGN PATENT DOCUMENTS

WO 9960793 A1 11/1999

\* cited by examiner

*Primary Examiner* — Michelle Chin
(74) *Attorney, Agent, or Firm* — Kowert, Hood, Munyon, Rankin & Goetzel, P.C.; Rory D. Rankin

(57) ABSTRACT

Systems, apparatuses, and methods for performing color channel correlation detection are disclosed. A compression engine performs a color channel transform on an original set of pixel data to generate a channel transformed set of pixel data. An analysis unit determines whether to compress the channel transformed set of pixel data or the original set of pixel data based on performing a comparison of the two sets of pixel data. In one scenario, the channel transformed set of pixel data is generated by calculating the difference between a first pixel component and a second pixel component for each pixel of the set of pixel data. The difference is then compared to the original first pixel component for each pixel. If the difference is less than or equal to the original for a threshold number of pixels, then the analysis unit decides to apply the color channel transform prior to compression.

20 Claims, 8 Drawing Sheets

*300*

Apply CT to R and B Channel Bytes
  RG=R-G
  BG=B-G           ← 305

Compare Magnitude of Post-CT Delta Calculation Result to the Magnitude of Original R and B Data
  Magnitude(RG) <= R ? +1 for CT_Vote
  Magnitude(BG) <= B ? +1 for CT_Vote           ← 310

Continue the Above for the Entirety of R and B Channel Data for the Given Block of Image/Frame Data If Final Count of Votes is Greater than Threshold, Apply CT to the Entirety of the R and B Channel Data for the Given Block of Image/Frame Data
  If CT_Vote > Threshold ? Apply CT
  Else Do Not Apply CT           ← 315

*Apply CT to R and B Channel Bytes*

- RG=R-G
- BG=B-G  ←‾ 305

*Compare Magnitude of Post-CT Delta Calculation Result to the Magnitude of Original R and B Data*

- Magnitude(RG) <= R ? +1 for CT_Vote
- Magnitude(BG) <= B ? +1 for CT_Vote  ←‾ 310

*Continue the Above for the Entirety of R and B Channel Data for the Given Block of Image/Frame Data*

*If Final Count of Votes is Greater than Threshold, Apply CT to the Entirety of the R and B Channel Data for the Given Block of Image/Frame Data*

- If CT_Vote > Threshold ? Apply CT
- Else Do Not Apply CT  ←‾ 315

FIG. 3

Apply CT to R and B Channel Bytes

-   RG=R-G
-   BG=B-G   ← 405

Take Delta Between Post-CT R and B with the Adjacent Pixel

-   RG Delta=$RG_1$-$RG_0$
-   RG Delta=$BG_1$-$BG_0$   ← 410

Take Delta Between Original R and B with the Adjacent Pixel

-   R Delta=$R_1$-$R_0$
-   B Delta=$B_1$-$B_0$   ← 415

Compare Magnitude of Post-CT Delta Calculation Result to the Magnitude of Original R and B Data

-   Magnitude(RG Delta) <= Magnitude(R Delta) ? +1 for CT_Vote
-   Magnitude(BG Delta) <= Magnitude(B Delta) ? +1 for CT_Vote   ← 420

Continue the Above for the Entirety of R and B Channel Data for the Given Block of Image/Frame Data If Final Count of Votes is Greater than Threshold, Apply CT to the Entirety of the R and B Channel Data for the Given Block of Image/Frame Data

-   If CT_Vote > Threshold ? Apply CT
-   Else Do Not Apply CT   ← 425

FIG. 4

COLOR CHANNEL CORRELATION DETECTION

BACKGROUND

Description of the Related Art

A graphics processing unit (GPU) is a complex integrated circuit that is configured to perform graphics-processing tasks. For example, a GPU can execute graphics-processing tasks required by an end-user application, such as a video-game application. The GPU can be a discrete device or can be included in the same device as another processor, such as a central processing unit (CPU). A GPU produces the pixels that make up an image from a higher level description of its components in a process known as rendering. GPUs typically utilize a concept of continuous rendering by the use of computing elements to process pixel, texture, and geometric data. The computing elements can execute the functions of rasterizers, setup engines, color blenders, hidden surface removal, texture mapping, etc. These computing elements are often referred to as shaders, shader processors, shader arrays, shader units, shader engines, etc. A shader processor or program can read and render data and perform any type of processing of the data.

Much of the processing involved in generating complex graphics scenes involves texture data. Textures can be any of various types of data, such as color, transparency, lookup tables, or other data. In some embodiments, textures can be digitized images to be drawn onto geometric shapes to add visual detail. A large amount of detail, through the use of textures, can be mapped to the surface of a graphical model as the model is rendered to create a destination image. The purpose of texture mapping is to provide a realistic appearance on the surface of objects. Textures can specify many properties, including colors, surface properties like specular reflection or fine surface details in the form of normal or bump maps. A texture can also be image data, color or transparency data, roughness/smoothness data, reflectivity data, etc.

In textures and surfaces, the smallest item of information is referred to as a "pixel." For convenience, pixels are generally arranged in a regular two-dimensional grid. By using such an arrangement, many common operations can be implemented by uniformly applying the same operation to each pixel independently. To represent a specific color, each pixel can have three values, one each for the amounts of red, green, and blue present in the desired color. Some pixel formats can also include a fourth value, called alpha, which represents the transparency of the pixel. This format is commonly referred to as ARGB or RGBA. Another format for representing pixel color is YCbCr, where Y corresponds to the luma, or brightness, of a pixel and Cb and Cr correspond to two color-difference chrominance components, representing the blue-difference (Cb) and red-difference (Cr). Each separate value of a source pixel can be referred to as a "pixel component" (e.g., red pixel component, blue pixel component, blue-difference chroma pixel component, luma pixel component) herein.

In 3D computer graphics, surface detail on objects is commonly added through the use of textures. For example, a 2D bitmap image of a brick wall can be applied, using texture mapping, to a set of polygons representing a 3D model of a building to give the 3D rendering of that object the appearance that it is made of bricks. Providing realistic computer graphics typically requires many high-quality, detailed textures. The use of textures can consume large amounts of storage space and bandwidth, and consequently textures can be compressed to reduce storage space and bandwidth utilization.

Compressing textures and surfaces can reduce storage and bandwidth costs on the graphics system while retaining as much of the quality of the original textures and surfaces as possible. One of the limitations of graphics processing is that memory or cache bandwidth is preventing the GPU from reaching its full capabilities. Compression can be utilized to decrease the amount of data fetched from memory or cache for processing by the GPU. However, the existing types of compression are not well suited for compressing textures and surfaces being processed by the GPU.

BRIEF DESCRIPTION OF THE DRAWINGS

The advantages of the methods and mechanisms described herein may be better understood by referring to the following description in conjunction with the accompanying drawings, in which:

FIG. 3 illustrates pseudocode for determining whether to apply a color transform in accordance with one implementation.

FIG. 4 illustrates pseudocode for determining whether to apply a color transform in accordance with one implementation.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for performing color channel correlation detection are disclosed herein. In one implementation, a compression engine performs a color channel transform on an original set of pixel data so as to generate a channel transformed set of pixel data. An analysis unit determines whether to compress the channel transformed set of pixel data or the original set of pixel data based on performing a comparison of the two sets of pixel data. In various implementations, the analysis unit comprises circuitry configured to perform the functions described herein. Further, as used herein, the term "unit" used to describe various elements herein (e.g., analysis unit, compression unit, channel transform unit, etc.) contemplates circuitry configured to perform the function(s) associated with the described unit. In one implementation, the channel transformed set of pixel data is generated by calculating the difference between a first pixel component and a second pixel component for each pixel of the set of pixel data. The difference is then compared to the original first pixel component for each pixel. If the difference is less than or equal to the original for a threshold number of pixels, then the analysis unit decides to apply the channel transform prior to compression.

Figure 1:
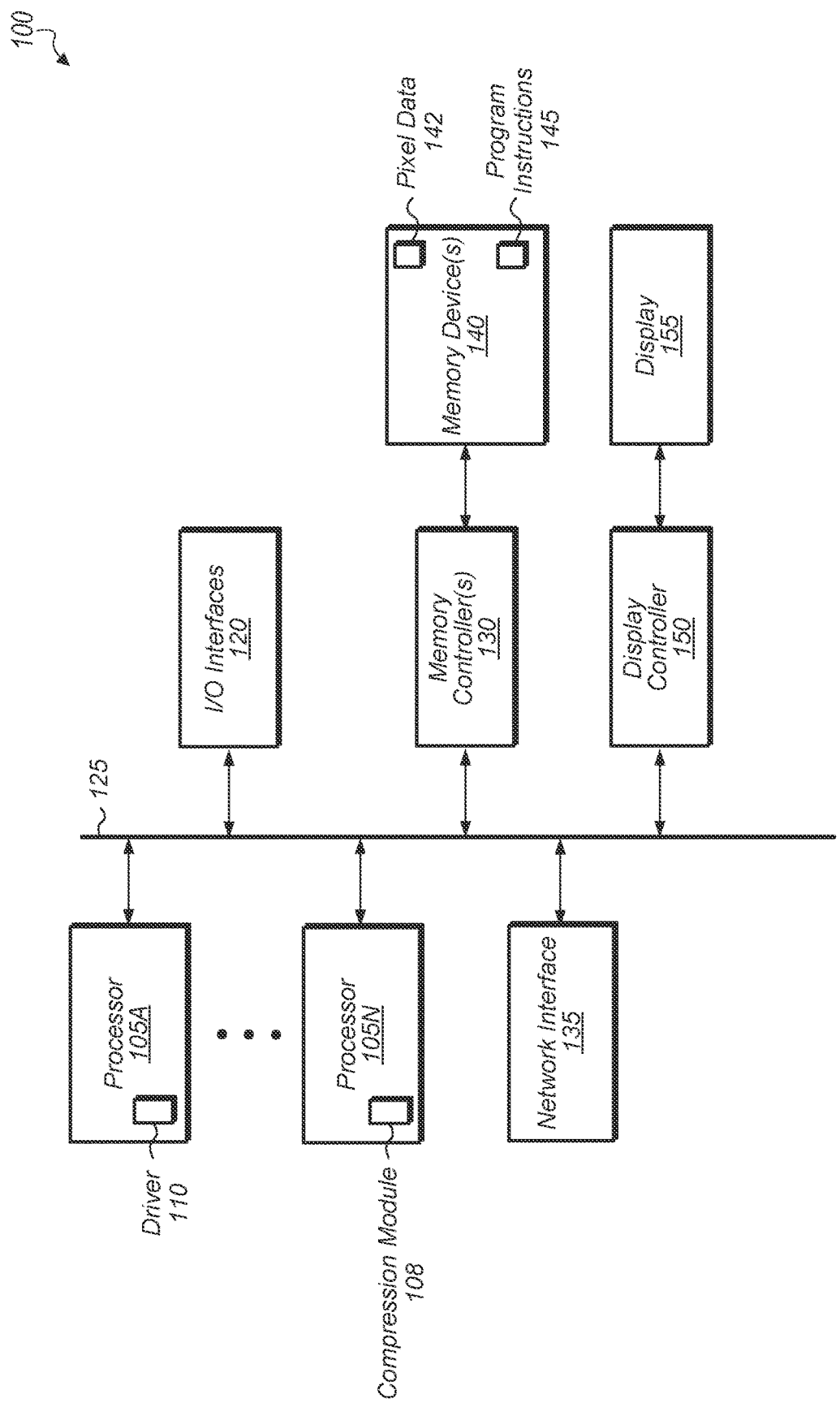
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 110 (e.g., graphics driver) for communicating with and/or controlling the operation of one or more of the other processors in system 100. In one implementation, processor 105N is a data parallel processor with a highly parallel architecture, such as a graphics processing unit (GPU) which processes data, executes parallel processing workloads, compresses pixel data with a compression module 108 comprising circuitry, renders pixels for display controller 150 to drive to display 155, and/or executes other workloads.

GPUs can execute graphics-processing tasks required by an end-user application, such as a video-game application. GPUs are also increasingly being used to perform other tasks which are unrelated to graphics. Other data parallel processors that can be included in system 100 include digital signal processors (DSPs), field programmable gate arrays (FPGAs), application specific integrated circuits (ASICs), and so forth. In some implementations, processors 105A-N include multiple data parallel processors.

In some implementations, an application executing on processor 105A utilizes a graphics application programming interface (API) to invoke a user mode driver 110 (or a similar GPU driver). In one implementation, user mode driver 110 issues one or more commands to a GPU for rendering one or more graphics primitives into displayable graphics images. Based on the graphics instructions issued by the application to the user mode driver 110, the user mode driver 110 formulates one or more graphics commands that specify one or more operations for the GPU to perform for rendering graphics. In some implementations, the user mode driver 110 is a part of an application running on a CPU. For example, the user mode driver 110 may be part of a gaming application running on the CPU. In one implementation, when driver 110 is a kernel mode driver, driver 110 is part of an operating system (OS) running on the CPU.

Memory controller(s) 130 are representative of any number and type of memory controllers accessible by processors 105A-N. While memory controller(s) 130 are shown as being separate from processors 105A-N, it should be understood that this merely represents one possible implementation. In other implementations, a memory controller 130 can be embedded within one or more of processors 105A-N. Memory controller(s) 130 are coupled to any number and type of memory devices(s) 140.

Memory device(s) 140 are representative of any number and type of devices containing memory and/or storage elements. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others. Memory device(s) 140 store pixel data 142 which can include original uncompressed pixel component values for a plurality of pixels, channel correlated pixel component values, compressed pixel component values, and/or compressed channel correlated pixel component values. Memory device(s) 140 also store program instructions 145, which can include a first set of program instructions for an application, a second set of program instructions for a driver component, and so on. Alternatively, program instructions 145, or a portion thereof, can be stored in a memory or cache device local to processor 105A and/or processor 105N.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
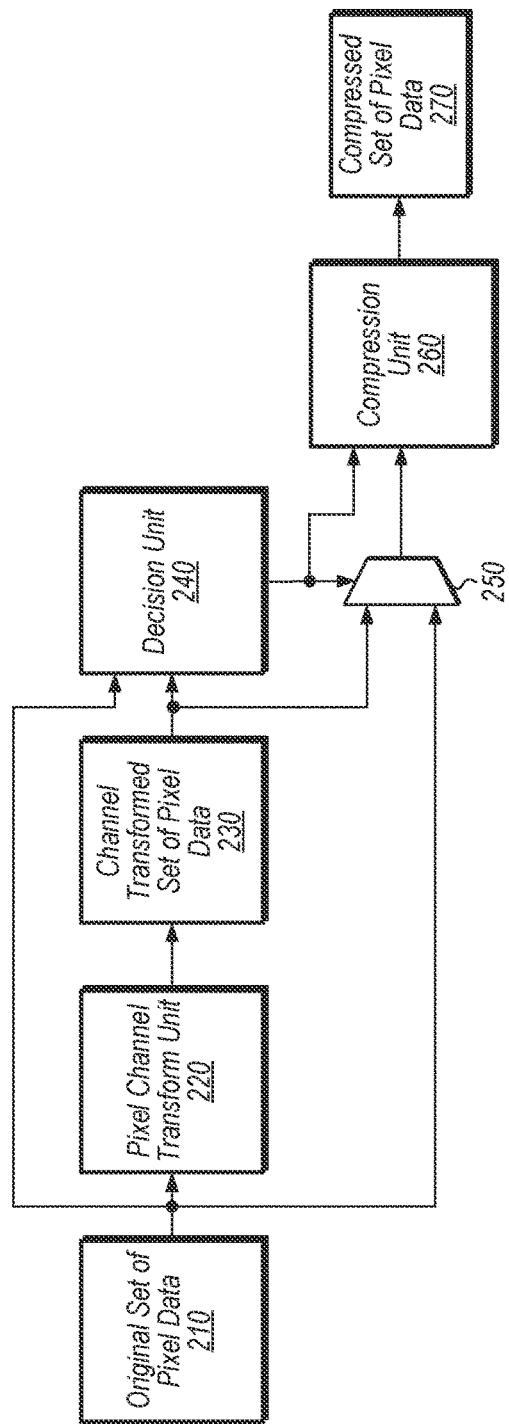
FIG. 2 is a block diagram of one implementation of a compression circuit apparatus.

Turning now to FIG. 2, a block diagram of one implementation of a compression module (or "compression circuit") apparatus 200 for compressing pixel data is shown. In one implementation, apparatus 200 includes pixel channel transform unit 220, decision unit 240, multiplexer (or mux) 250, and compression unit 260. It is noted that decision unit 240 may also be referred to as analysis unit 240. In other implementations, apparatus 200 can include other arrangements of components which include one or more components not shown in FIG. 2 and/or omit one or more components shown in FIG. 2. It is noted that apparatus 200 can be implemented using any suitable combination of circuitry, processing elements, and program instructions. For example, apparatus 200 can be implemented by a processor executing program instructions and/or by fixed-function circuitry (e.g., ASIC) or programmable circuitry (e.g., FPGA).

Pixel channel transform unit 220 receives original set of pixel data 210. It is noted that original set of pixel data 210 can be stored in a cache, memory, or other storage medium.

Original set of pixel data 210 includes any number of pixels for any size of an image or video frame or portion thereof. The format of original set of pixel data 210 can vary according to the implementation. In one implementation, original set of pixel data 210 is in the RGB format and includes three pixel channels—red, green, and blue. In another implementation, original set of pixel data 210 is in the ARGB format and includes four pixel channels—alpha, red, green, and blue. In a further implementation, original set of pixel data 210 includes four channels, with three of the channels the red, green, and blue channels and the fourth channel generated based on these three channels. In a still further implementation, original set of pixel data 210 is in the YCbCr format and includes three pixel channels—Y, Cb, and Cr. In other implementations, original set of pixel data 210 is encoded in any of various other types of formats and includes any number of pixel channels.

The size of original set of pixel data 210 can vary from implementation to implementation. In one implementation, original set of pixel data 210 is a 4×4 block of pixels. In another implementation, original set of pixel data 210 is a 16×16 block of pixels. In other implementations, original set of pixel data 210 includes other numbers of pixels in square, rectangular, or other shaped regions.

Pixel channel transform unit 220 generates channel transformed set of pixel data 230 from original set of pixel data 210. In one implementation, for each pixel, pixel channel transform unit 220 calculates the difference between the red and green pixel component values for the pixel and the difference between the blue and green pixel component values for the pixel. While the original pixel channel values are referred to as R and B, the channel transformed versions of these values are referred to as R-G and B-G, respectively. Alternatively, the R-G pixel component may be referred to as RG and the B-G pixel component may be referred to as BG. Original set of pixel data 210 and channel transformed set of pixel data 230 are provided to decision unit 240.

In one implementation, decision unit 240 compares the original R and B pixel component values of each pixel to their counterpart RG and BG pixel component values. If the magnitude of the color transformed RG value is less than or equal to original R pixel component, then a vote variable is incremented. Also, if the magnitude of the color transformed BG value is less than or equal to original B pixel component, then a vote variable is incremented. After the entire set of pixel data has been processed, if the vote variable is greater than a threshold, then channel transformed set of pixel data 230 is compressed by compression unit 260. Compression unit 260 can use any suitable type of compression algorithm for compressing pixel data, with the algorithm varying from implementation to implementation. Otherwise, if the vote variable is less than or equal to the threshold, then the original set of pixel data 210 prior is compressed by compression unit 260. The value of the threshold varies from implementation to implementation. It should be understood that the above example is merely one possible way to implement a color transform scheme. In other implementations, variations of the above scheme can be employed. A few examples of variations will be described throughout the remainder of this disclosure. However, it is noted that these are non-limiting examples and other schemes for applying color transforms and/or channel transforms are possible and are contemplated.

In one implementation, decision unit 240 generates the select signal that controls which set of pixel data is passed through mux 250 to compression unit 260. In another implementation, the selection of pixel data is performed in software. It is noted that when the pixel data is in the RGB color space, the channel transform can be referred to as a color transform. However, the term "color transform" may be referred to more generally herein as "channel transform".

Referring now to FIG. 3, pseudocode 300 for determining whether to apply a color transform in accordance with one implementation is shown. In step 305, the color transform is applied to the red (or R) and blue (or B) channel bytes by calculating RG as R-G and BG as B-G, with G referring to the green pixel channel. In other words, in step 305, for each pixel, the green component is subtracted from the red component to calculate RG, and the green component is subtracted from the blue component to calculate BG. Next, in step 310, the magnitude of RG is compared to the original R value and the magnitude of BG is compared to the original B value for each pixel. If the magnitude of RG is less than or equal to the original R value, then the color transform vote (or CT_Vote) is incremented. Also, if the magnitude of BG is less than or equal to the original B value, then the color transform vote is incremented. This comparison is performed for each pixel of the pixel block.

In step 315, after all pixels have been processed, if CT_Vote is greater than a threshold value, then the color transform is applied to the pixel block prior to compression. Otherwise, if CT_Vote is less than or equal to the threshold value, then the color transform is not applied to the pixel block prior to compression. The value of the threshold can vary according to the implementation.

Turning now to FIG. 4, pseudocode 400 for determining whether to apply a color transform in accordance with one implementation is shown. In step 405, the color transform is applied to the red (or R) and blue (or B) channel bytes by calculating RG as R-G and BG as B-G, with G referring to the green pixel channel. Accordingly, for each pixel, the green component is subtracted from the red component to calculate RG, and the green component is subtracted from the blue component to calculate BG.

Next, in step 410, the difference (or delta) between the RG values of adjacent pixels is calculated and the difference between the BG Values of adjacent pixels is calculated for each pair of pixels. These difference values are referred to as RG Delta and BG Delta. Then, in step 415, deltas between the original R and B values of adjacent pixels are calculated and referred to as R Delta and B Delta, respectively. Next, in step 420, the magnitude of RG Delta is compared to the magnitude of R Delta for each pair of pixels, and if the magnitude of RG Delta is less than or equal to the magnitude of R Delta, then the color transform vote (or CT_Vote) is incremented. Similarly, the magnitude of BG Delta is compared to the magnitude of B Delta for each pair of pixels, and if the magnitude of BG Delta is less than or equal to the magnitude of B Delta, then the color transform vote is incremented. In another implementation, the less than or equal to sign is changed to a less than sign. In this implementation, CT_Vote is incremented if the magnitude of RG Delta is less than the magnitude of R Delta, and CT_Vote is incremented if the magnitude of BG Delta is less than the magnitude of B Delta. Steps 405-420 continue through the remainder of the red and blue channel data for the given image or video frame block. The size of the image/frame block (e.g., 8×8 pixels, 16×15 pixels) can vary according to the implementation.

In step 425, after the given image/frame block has been processed, CT_Vote is compared to a threshold. The value of the threshold can vary according to the size of the image/frame block. For example, in one implementation, if there are 32 pixels in the block, then the threshold is equal to 15.

In other implementations, the value of the threshold can vary. If CT_Vote is greater than the threshold, then the color transform is applied to the given image/frame block. Otherwise, if CT_Vote is less than or equal to the threshold, then the color transform is not applied to the given image/frame block. A separate instance of pseudocode 400 can be performed for each block of the overall image/frame.

It is noted that a color transform may be referred to more generally as a channel transform. In other words, for pixel data which is encoded in other formats besides the RGB format, pseudocode 400 can still be used, albeit with modifications adapted to the specific format, to perform a channel transform for any number of pixel channels.

Figure 5:
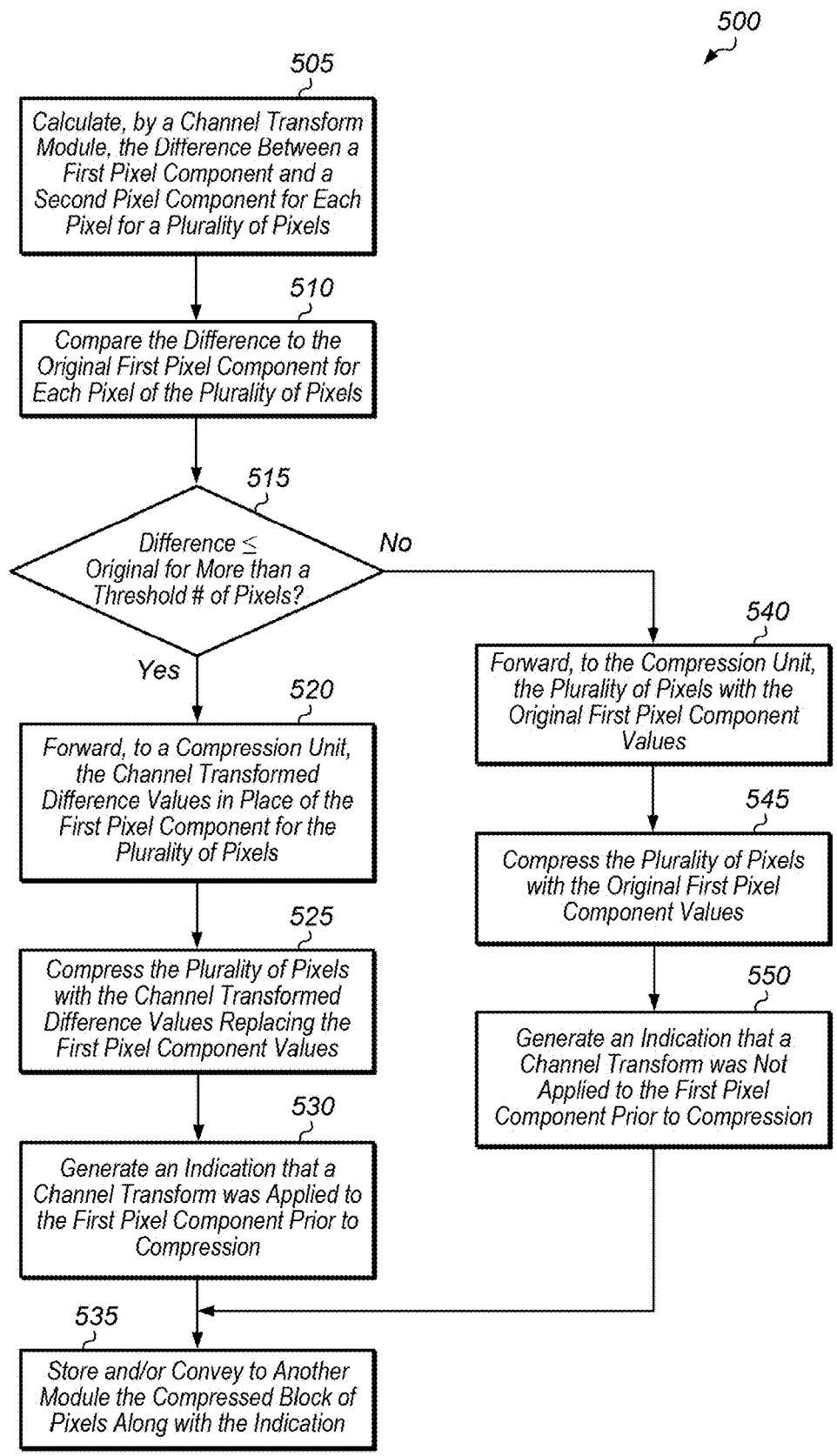
FIG. 5 is a generalized flow diagram illustrating one implementation of a method for performing a channel transform on pixel data prior to compression.
Figure 6:
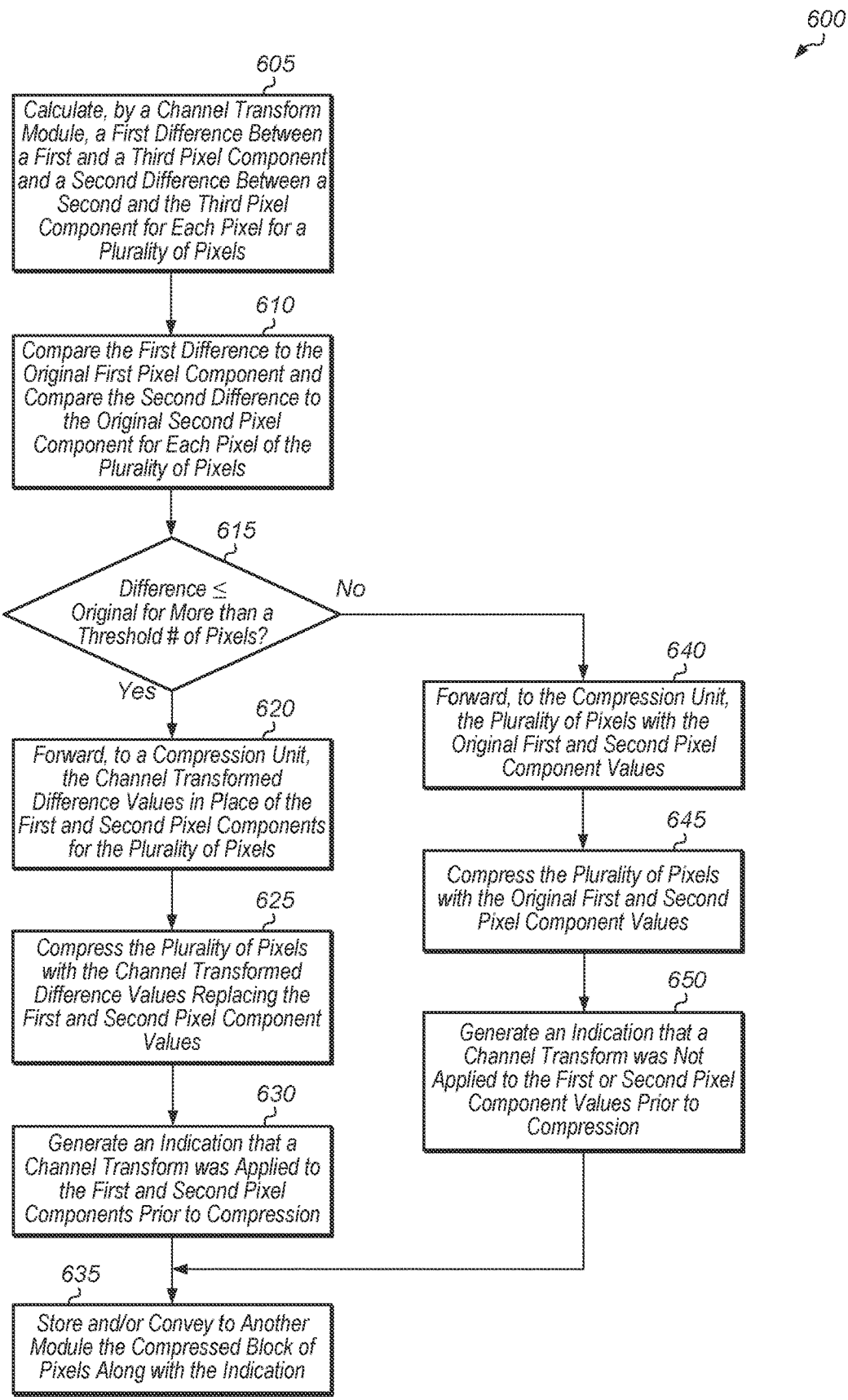
FIG. 6 is a generalized flow diagram illustrating another implementation of a method for performing a channel transform on pixel data prior to compression.
Figure 7:
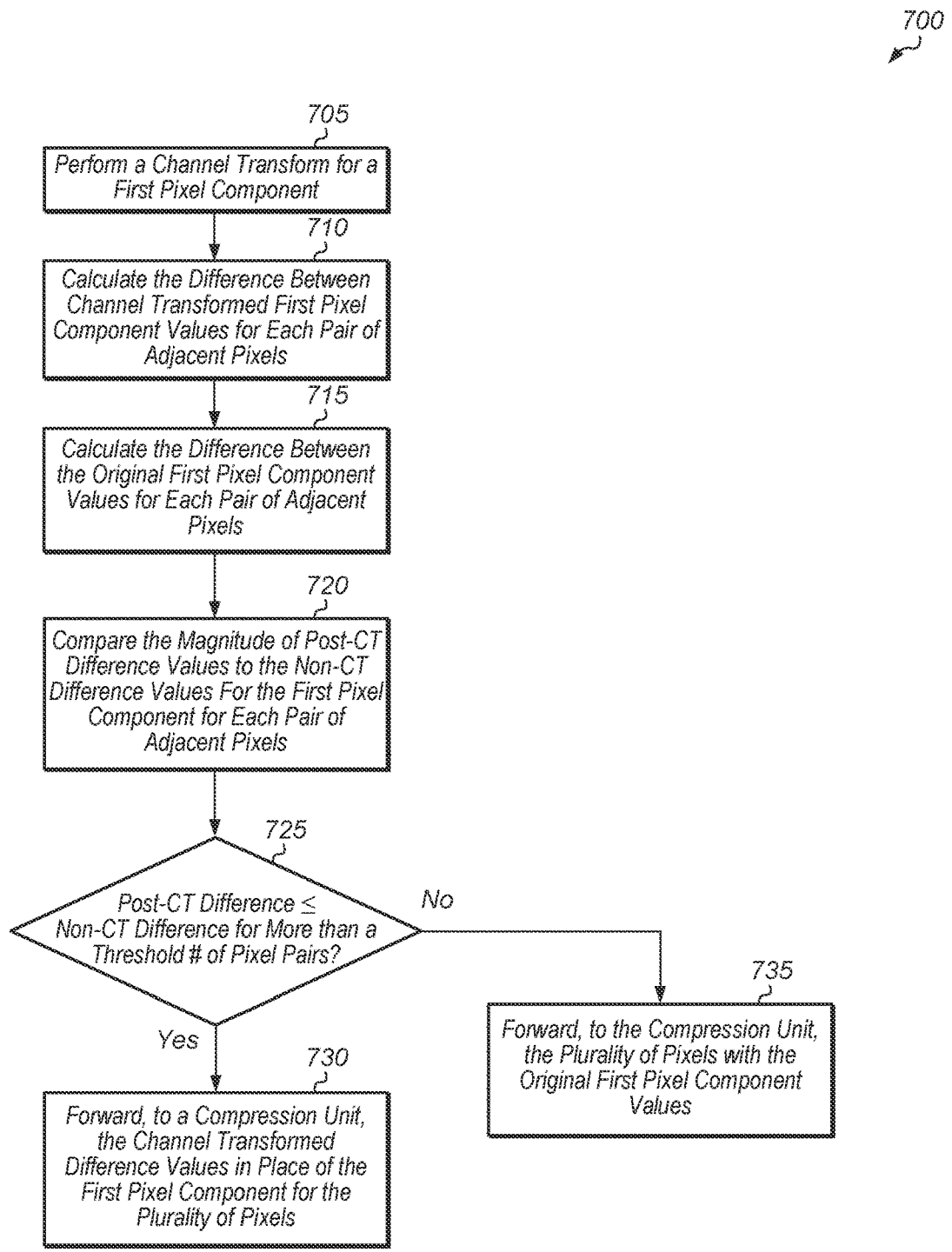
FIG. 7 is a generalized flow diagram illustrating one implementation of a method for performing channel transforms based on delta calculations for adjacent pixels.
Figure 8:
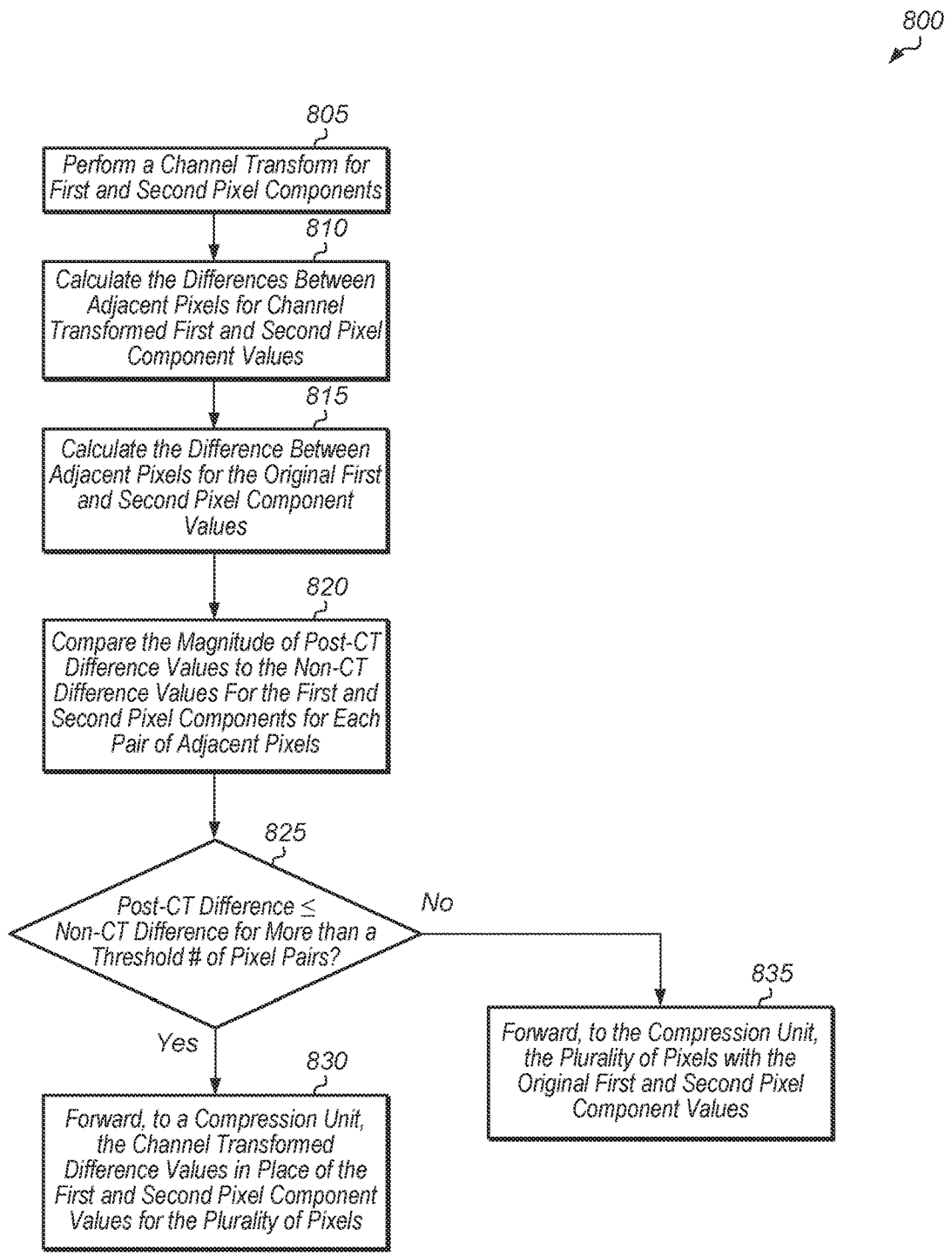
FIG. 8 is a generalized flow diagram illustrating another implementation of a method for performing channel transforms based on delta calculations for adjacent pixels.

Referring now to FIG. 5, one implementation of a method 500 for performing a channel transform on pixel data prior to compression is shown. For purposes of discussion, the steps in this implementation and those of FIG. 6-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500 (and methods 600-800).

A channel transform module (e.g., pixel channel transform unit 220 of FIG. 2) calculates the difference between a first pixel component and a second pixel component for each pixel of a plurality of pixels (block 505). The plurality of pixels refers to the pixels which make up at least a portion of an image or video frame. The portion can include any number of pixels and have any shape (e.g., line, square, rectangular block) within the overall image/frame. Next, the channel transform module compares the difference to the original first pixel component for each pixel of the plurality of pixels (block 510). If the magnitude of the difference is less than or equal to the original first pixel component for more than a threshold number of pixels (conditional block 515, "yes" leg), then the channel transform module forwards, to a compression unit (e.g. compression unit 260) the channel transformed difference values in place of the first pixel component for the plurality of pixels (block 520). The value of the threshold number of pixels may vary from implementation to implementation. In one implementation, the threshold number is one fourth the number of pixels in the plurality of pixels. For example, if 64 pixels are being processed, then the threshold would be 16 in this implementation. In other implementations, the threshold number is any of various other ratios of the plurality of pixels.

Next, the compression unit compresses the plurality of pixels with the channel transformed difference values replacing the first pixel component values (block 525). The compression unit generates an indication that a channel transform was applied to the first pixel component prior to compression (block 530). The channel transform indication will be detected by a decompression unit which will then reverse the channel transform after decompression. The compression unit then stores and/or conveys to another module the compressed block of pixels along with the indication (block 535). After block 535, method 500 ends.

Otherwise, if the magnitude of the difference is less than or equal to the first pixel component for less than or equal to the threshold number of pixels (conditional block 515, "no" leg), then the channel transform module forwards, to the compression unit, the plurality of pixels with the original first pixel component values (block 540). In this case, the channel transformed difference values can be discarded.

Next, the compression unit compresses the plurality of pixels with the original first pixel component values (block 545). The compression unit generates an indication that a channel transform was not applied to the first pixel component prior to compression (block 550). The compression unit then stores and/or conveys to another module the compressed block of pixels along with the indication (block 535). After block 535, method 500 ends.

Turning now to FIG. 6, another implementation of a method 600 for performing a channel transform on pixel data prior to compression is shown. A channel transform module (e.g., color transform unit 220 of FIG. 2) calculates a first difference between a first pixel component and a third pixel component for each pixel of a plurality of pixels, and the color transform module calculates a second difference between a second pixel component and the third pixel component for each of the plurality of pixels (block 605). In one implementation, the first pixel component is the red component, the second pixel component is the blue component, and the third pixel component is the green component. However, in other implementations, the first, second, and/or third pixel components may be other types of pixel components.

Next, the channel transform module compares the first difference to the original first pixel component and the second difference to the second pixel component for each pixel of the plurality of pixels (block 610). If the sum of the number of times the magnitude of the first difference is less than or equal to the original first pixel component added to the number of times the magnitude of the second difference is less than or equal to the original second pixel component is greater than a threshold number (conditional block 615, "yes" leg), then the channel transform module forwards, to a compression unit (e.g. compression unit 260) the channel transformed difference values in place of the first and second pixel components for the plurality of pixels (block 620). The value of the threshold number may vary from implementation to implementation. In one implementation, the threshold number is one half the number of pixels in the plurality of pixels. For example, if 32 pixels are being processed, then the threshold would be 16 in this implementation. In other implementations, the threshold number is any of various other ratios of the plurality of pixels.

Next, the compression unit compresses the plurality of pixels with the channel transformed difference values replacing the first and second pixel component values (block 625). The compression unit generates an indication that a channel transform was applied to the first and second pixel components prior to compression (block 630). The compression unit then stores and/or conveys to another module the compressed block of pixels along with the indication (block 635). After block 635, method 600 ends.

Otherwise, if the sum (of the number of times the magnitude of the first difference is less than or equal to the first pixel component added to the number of times the magnitude of the second difference is less than or equal to the second pixel component) is less than or equal to the threshold number (conditional block 615, "no" leg), then the channel transform module forwards, to the compression unit (e.g. compression unit 260), the plurality of pixels with the original first and second pixel component values (block 640). Next, the compression unit compresses the plurality of pixels with the original first and second pixel component values (block 645). The compression unit generates an indication that a channel transform was not applied to the first or second pixel component values prior to compression (block 650). The compression unit then stores and/or conveys to another module the compressed block of pixels along with the indication (block 635). After block 635, method 600 ends.

Referring now to FIG. 7, one implementation of a method 700 for performing channel transforms based on delta calculations for adjacent pixels is shown. A channel transform module performs a channel transform for a first pixel component (block 705). In one implementation, the channel transform is performed by subtracting the green pixel component value from the red pixel component value for each pixel of a plurality of pixels. In other implementations, the first pixel component can be a different type of pixel component and/or other types of channel transforms can be performed to the first pixel component. Next, the channel transform module calculates the difference between channel transformed first pixel component values for each pair of adjacent pixels (block 710). Also, the channel transform module calculates the difference between the original first pixel component values for each pair of adjacent pixels (block 715).

Next, the channel transform module compares the magnitude of post-channel-transform (post-CT) difference values (calculated in block 710) to the non-channel-transform (non-CT) difference values (calculated in block 715) for the first pixel component for each pair of adjacent pixels (block 720). If the post-CT difference is less than or equal to the non-CT difference for more than a threshold number of pixel pairs (conditional block 725, "yes" leg), then the channel transform module forwards, to a compression unit, the channel transformed difference values in place of the first pixel component for the plurality of pixels (block 730). After block 730, method 700 ends. The value of the threshold can vary from implementation to implementation. Otherwise, if the post-CT difference is less than or equal to the non-CT difference for less than or equal to the threshold number of pixel pairs (conditional block 725, "no" leg), then the channel transform module forwards, to the compression unit, the plurality of pixels with the original first pixel component values (block 735). After block 735, method 700 ends.

Turning now to FIG. 8, another implementation of a method 800 for performing channel transforms based on delta calculations for adjacent pixels is shown. A channel transform module performs a channel transform for first and second pixel components (block 805). In one implementation, a first channel transform is performed by subtracting the green pixel component value from the red pixel component value and a second channel transform is performed by subtracting the green pixel component value from the blue pixel component value for each pixel of a plurality of pixels. In other implementations, the first and second pixel components can be other types of pixel components and/or other types of channel transforms can be performed to the first and second pixel components. Next, the channel transform module calculates the difference between adjacent pixels for channel transformed first and second pixel component values (block 810). Also, the channel transform module calculates the difference between adjacent pixels for the original first pixel component values and the channel transform module calculates the difference between adjacent pixels for the original second pixel component values for each pair of adjacent pixels (block 815).

Next, the channel transform module compares the magnitude of post-CT difference values (calculated in block 810) to the non-CT difference values (calculated in block 815) for the first and second pixel components for each pair of adjacent pixels (block 820). If the post-CT difference is less than or equal to the non-CT difference for more than a threshold number of pixel pairs (conditional block 825, "yes" leg), then the channel transform module forwards, to a compression unit, the channel transformed difference values in place of the first and second pixel component values for the plurality of pixels (block 830). After block 830, method 800 ends. The value of the threshold can vary from implementation to implementation. Otherwise, if the post-CT difference is less than or equal to the non-CT difference for less than or equal to the threshold number of pixel pairs (conditional block 825, "no" leg), then the channel transform module forwards, to the compression unit, the plurality of pixels with the original first and second pixel component values (block 835). After block 835, method 800 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   an interface configured to receive a set of pixel data; and
   a compression circuit configured to:
   perform a channel transform on the set of pixel data to generate a channel transformed set of pixel data wherein a channel transform for a given pixel comprises calculating a difference between at least two different channels of the given pixel;
   perform a comparison of the channel transformed set of pixel data to the set of pixel data in original form; and
   compress the channel transformed set of pixel data to represent the original set of pixel data responsive to the comparison meeting a first condition.

2. The apparatus as recited in claim 1, wherein the first condition is a channel transformed pixel component value magnitude being less than or equal to an original pixel component value for a threshold number of pixels.

3. The apparatus as recited in claim 1, wherein the channel transform is applied to a first pixel component of the set of pixel data, and wherein the set of pixel data includes a 4×4 block of pixels.

4. The apparatus as recited in claim 3, wherein the first pixel component is a red pixel component, and wherein performing the channel transform comprises calculating a difference between the red pixel component and a green pixel component for each pixel of the set of pixel data.

5. The apparatus as recited in claim 1, wherein to perform the channel transform, the compression circuit is configured to:
generate, for a first pixel component of each pixel, a first channel transformed pixel component equal to a difference between the first pixel component and a third pixel component; and
generate, for a second pixel component of each pixel, a second channel transformed pixel component equal to a difference between the second pixel component and a third pixel component.

6. The apparatus as recited in claim 5, wherein:
the first pixel component is a red pixel component;
the second pixel component is a blue pixel component; and
the third pixel component is a green pixel component.

7. The apparatus as recited in claim 1, wherein the compression circuit is further configured to store an indication in a header of a compressed version of the channel transformed set of pixel data that the channel transform was used prior to compression.

8. A method comprising:
performing, by a compression circuit, a channel transform on a set of pixel data to generate a channel transformed set of pixel data, wherein a channel transform for a given pixel comprises calculating a difference between at least two different channels of the given pixel;
performing a comparison of the channel transformed set of pixel data to the set of pixel data in original form; and
compressing the channel transformed set of pixel data to represent the original set of pixel data responsive to the comparison meeting a first condition.

9. The method as recited in claim 8, wherein the first condition is a channel transformed pixel component value magnitude being less than or equal to an original pixel component value for a threshold number of pixels.

10. The method as recited in claim 8, wherein the channel transform is applied to a first pixel component of the set of pixel data, and wherein the set of pixel data includes an 4×4 block of pixels.

11. The method as recited in claim 10, wherein the first pixel component is a red pixel component, and wherein performing the channel transform comprises calculating a difference between the red pixel component and a green pixel component for each pixel of the set of pixel data.

12. The method as recited in claim 8, wherein performing the channel transform comprises:
generating, for a first pixel component of each pixel, a first channel transformed pixel component equal to a difference between the first pixel component and a third pixel component; and
generating, for a second pixel component of each pixel, a second channel transformed pixel component equal to a difference between the second pixel component and a third pixel component.

13. The method as recited in claim 12, wherein:
the first pixel component is a red pixel component;
the second pixel component is a blue pixel component; and
the third pixel component is a green pixel component.

14. The method as recited in claim 13, further comprising:
comparing, for each pixel, the first channel transformed pixel component value to the original first pixel component value;
comparing, for each pixel, the second channel transformed pixel component to the original second pixel component;
incrementing, for each pixel, a vote value if a magnitude of the first channel transformed pixel component value is less than or equal to the original first pixel component value;
incrementing, for each pixel, the vote value if a magnitude of the second channel transformed pixel component value is less than or equal to the original second pixel component value;
comparing the vote value to a threshold responsive to comparing both channels of the set of pixel data in its entirety;
compressing the channel transformed set of pixel data to represent the original set of pixel data responsive to the vote value being greater than the threshold; and
discarding the channel transformed set of pixel data and compressing the original set of pixel data responsive to the vote value being less than or equal to the threshold.

15. A system comprising:
a memory configured to store pixel data; and
a compression circuit configured to:
perform a channel transform on a set of pixel data retrieved from the memory to generate a channel transformed set of pixel data, wherein a channel transform for a given pixel comprises calculating a difference between at least two different channels of the given pixel;
perform a comparison of the channel transformed set of pixel data to the set of pixel data in original form; and
apply the channel transform on the set of pixel data prior to compression responsive to the comparison meeting a first condition.

16. The system as recited in claim 15, wherein the first condition is a channel transformed pixel component value magnitude being less than or equal to an original pixel component value for a threshold number of pixels.

17. The system as recited in claim 15, wherein the channel transform is applied to a first pixel component of the set of pixel data, and wherein the set of pixel data includes an 4×4 block of pixels.

18. The system as recited in claim 17, wherein the first pixel component is a red pixel component, and wherein performing the channel transform comprises calculating a difference between the red pixel component and a green pixel component for each pixel of the set of pixel data.

19. The system as recited in claim 15, wherein to perform the channel transform, the compression circuit is configured to:
generate, for a first pixel component of each pixel, a first channel transformed pixel component equal to a difference between the first pixel component and a third pixel component; and
generate, for a second pixel component of each pixel, a second channel transformed pixel component equal to a difference between the second pixel component and a third pixel component.

20. The system as recited in claim 19, wherein:
the first pixel component is a red pixel component;
the second pixel component is a blue pixel component; and
the third pixel component is a green pixel component.

\* \* \* \* \*